W. H. FISHER.
SASH RELISHING MACHINE.
No. 185,907.             Patented Jan. 2, 1877.
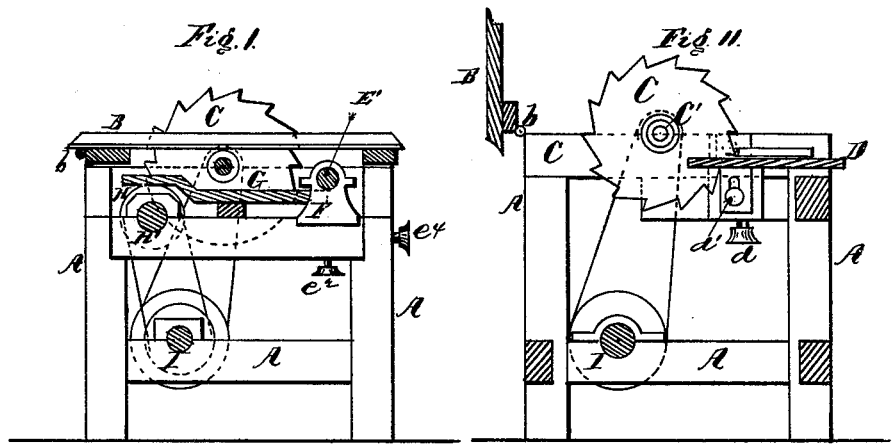
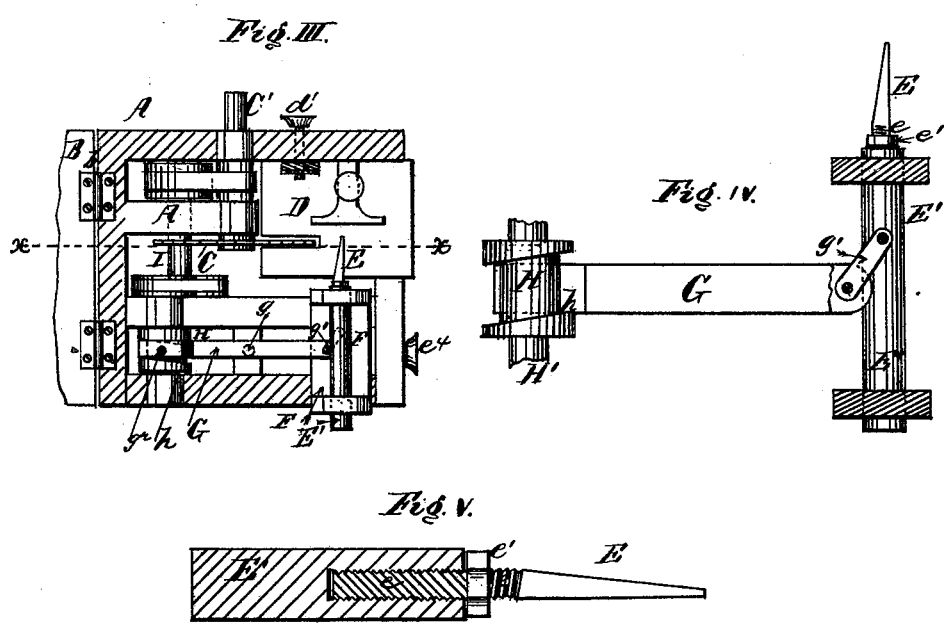
Witnesses:
Richard Gerner
Franklin Barrett
Inventor:
William H. Fisher.
Per: Henry Gerner,
his Atty.

UNITED STATES PATENT OFFICE.

WILLIAM H. FISHER, OF SELIN'S GROVE, PENNSYLVANIA, ASSIGNOR OF THREE-FOURTHS HIS RIGHT TO CHAS. K. FISHER, OF SAME PLACE, AND HENRY U. KISTNER AND PETER MOYER, JR.

IMPROVEMENT IN SASH-RELISHING MACHINES.

Specification forming part of Letters Patent No. 185,907, dated January 2, 1877; application filed June 21, 1876.

*To all whom it may concern:*

Be it known that I, WM. HENRY FISHER, of Selin's Grove, Snyder county, Pennsylvania, have invented a new and useful Improvement in Sash-Relishing Machines, of which the following is a specification:

The nature of this invention consists in an ordinary circular saw and its table, an additional table on the same frame for use when the machine is used as a sash-relisher, (the one saw performing the work when either table is in use,) and a chisel, automatically moved by the mechanism of the machine, and used to cut out the piece of wood between the saw-cuts or relishes. By using this machine the operation of relishing sash-rails is performed with only once handling the stuff.

The invention will be readily understood by reference to the accompanying drawings, of which—

Figure I is a side elevation of the machine with the top or saw table thrown down, as in use for sawing purposes. Fig. II is a sectional elevation of the machine, taken on the line $x\ x$ of Fig. III, showing the saw-table turned up in the position in which the machine is used for a sash-relisher. Fig. III is a plan of the machine, with the top or saw table removed. Fig. IV is a view of the mechanism for operating the chisel that cuts out the sash-relishes. In this view parts of the machinery are broken out to show the operative parts to better advantage. Fig. V is a sectional detail of the relishing-chisel and its arbor.

This machine is built on a strong frame, A, that supports all of the operative parts of the machine. A top or saw-table, B, is hinged at $b$ to one side of the frame A, and arranged to be laid down flat on the top of the said frame, as shown in Fig. I, or raised up, as shown in Fig. II. When this table is laid down flat, as shown in Fig. I, it simply becomes a table on which to rest the work for the circular saw C. When the table B is raised up, as in Fig. II, it is put out of the way, so that the lower work-table D may be used.

The saw C is mounted on an arbor, C', which has its bearings in the frame A, below the table B, and above the top plane of the table D. This saw is used in common for the work on either table, as may be required. The table D is adjusted as to vertical height by means of the screw $d$, and is held in position by means of the fastening-screw $d'$ at whatever height may be desired. This table is used for the purpose of relishing or cutting the ends of sash-rails, and the chisel E, working across the said table D, and at right angles to the saw-cut, is used to cut out of the sash-rail the part cut off by the saw.

The chisel E is attached to its arbor E' by means of the screw $e$ and the jam-nut $e^1$, which holds the chisel firmly in its arbor, as is clearly shown in Fig. V. The arbor E' rests in bearings on the adjustable bed F. This bed, with its arbor, is adjusted to its proper working position for the chisel E by means of the adjusting-screws $e^2$, and it is adjusted laterally by means of the set-screw $e^4$, all of these set-screws having their bearings in the frame A. The chisel and its arbor are given a horizontal reciprocating motion by means of the lever G, which is pivoted to the frame A by the pin $g$, as shown in Fig. III. The front end of the lever G is connected to the bottom of the chisel-arbor by means of a link, $g^1$, as shown in Fig. IV. This connection permits the free reciprocating motion required by the chisel, and also permits the necessary adjustment given by the screw $e^4$. The lever G is actuated by means of the cam H on the counter-shaft H'. The groove $h$ of the said cam receives a small lug, $g^2$, on the bottom side of the lever G, and so imparts motion to it.

The driving-shaft I, which has its bearings in the bottom part of the frame A, imparts, through the medium of suitable belts and pulleys, motion to both the saw-arbor C' and the counter-shaft H'.

Having thus described my invention, I desire to claim—

1. The saw C, with the tables B and D, the chisel E, with its operating-lever G, and cam H, all arranged upon a common frame, A, and the operative parts driven by a common driving-shaft, I, as and for the purpose set forth.

2. The chisel E and its operating-arbor E′, united together by the screw $e$ and jam-nut $e^1$, as and for the purpose set forth.

3. The bed-plate F, with its adjusting-screws $e^2$ and $e^4$, arranged in combination with the chisel-arbor E′ and the frame A, as and for the purpose set forth.

WM. H. FISHER.

Witnesses:
 L. R. HUMMEL,
 A. C. FISS.